United States Patent
Wood et al.

(10) Patent No.: US 9,276,940 B2
(45) Date of Patent: *Mar. 1, 2016

(54) DATA PLAN ACTIVATION

(71) Applicant: CRADLEPOINT, INC., Boise, ID (US)

(72) Inventors: Steven Wood, Boise, ID (US); Patrick Sewall, Boise, ID (US); David Alan Johnson, Boise, ID (US)

(73) Assignee: CradlePoint, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/260,967

(22) Filed: Apr. 24, 2014

(65) Prior Publication Data

US 2014/0237557 A1    Aug. 21, 2014

Related U.S. Application Data

(63) Continuation of application No. 12/351,502, filed on Jan. 9, 2009, now Pat. No. 8,732,808, which is a continuation-in-part of application No. 10/936,124, filed on Sep. 8, 2004, now Pat. No. 7,764,784.

(60) Provisional application No. 61/019,882, filed on Jan. 9, 2008.

(51) Int. Cl.
 *H04L 29/06* (2006.01)
 *H04L 12/28* (2006.01)

(52) U.S. Cl.
 CPC ............ *H04L 63/10* (2013.01); *H04L 12/2859* (2013.01); *H04L 63/102* (2013.01)

(58) Field of Classification Search
 CPC ....................................................... H04L 63/10
 USPC ...................................... 370/351, 395.21, 389
 See application file for complete search history.

(56) References Cited

U.S. PATENT DOCUMENTS

| | | | | |
|---|---|---|---|---|
| 6,438,219 | B1 * | 8/2002 | Karau et al. | 379/112.01 |
| 6,609,197 | B1 * | 8/2003 | Ketcham et al. | 713/155 |
| 6,625,135 | B1 * | 9/2003 | Johnson et al. | 370/332 |
| 7,764,784 | B2 * | 7/2010 | Sewall | 379/428.02 |
| 8,732,808 | B2 * | 5/2014 | Sewall et al. | 726/7 |
| 2001/0007978 | A1 * | 7/2001 | Marsh et al. | 705/10 |
| 2002/0077107 | A1 * | 6/2002 | Eng et al. | 455/445 |
| 2003/0013434 | A1 * | 1/2003 | Rosenberg et al. | 455/414 |
| 2004/0110544 | A1 * | 6/2004 | Oyagi et al. | 455/575.1 |

(Continued)

OTHER PUBLICATIONS

Office Action dated Sep. 24, 2014, issued in CA 2730483.

(Continued)

*Primary Examiner* — Parth Patel
(74) *Attorney, Agent, or Firm* — Parsons Behle & Latimer

(57) ABSTRACT

A method, implemented by a router device, for guiding a user in establishing access privileges for a data exchanger includes causing the data exchanger to establish a remote link with a data service provider. Access content is obtained from the data service provider and presented to a client device. Access data provided in response to the presenting of the access content is received. The access content when presented by the client device enables a user to supply the access data. The access data is useable by the data service provider to set access privileges associated with the data exchanger that enable the data exchanger to be utilized to perform a desired function. The access data is returned to the data service provider via the remote link. The data exchanger is utilized to implement the desired function.

18 Claims, 4 Drawing Sheets

(56) References Cited

U.S. PATENT DOCUMENTS

| | | | |
|---|---|---|---|
| 2004/0137908 A1* | 7/2004 | Sinivaara et al. | 455/452.1 |
| 2007/0255848 A1* | 11/2007 | Sewall et al. | 709/232 |
| 2008/0046561 A1* | 2/2008 | Pham et al. | 709/224 |
| 2008/0049630 A1* | 2/2008 | Kozisek et al. | 370/250 |
| 2008/0167072 A1* | 7/2008 | Berstis et al. | 455/557 |
| 2008/0313327 A1* | 12/2008 | Sewall et al. | 709/224 |
| 2009/0172658 A1* | 7/2009 | Wood et al. | 717/174 |

OTHER PUBLICATIONS

Office Action dated Sep. 23, 2014, issued in CA 2730490.

* cited by examiner

DATA PLAN ACTIVATION

CROSS REFERENCE TO RELATED APPLICATIONS

The present application is a continuation of and claims the benefit of priority under 35 U.S.C. §119 to U.S. patent application Ser. No. 12/351,502 entitled "Data Plan Activation and Modification" filed Jan. 9, 2009, U.S. patent application Ser. No. 10/936,124 entitled "Device Cradle" filed Sep. 8, 2004 and U.S. Provisional Application No. 61/019,882 entitled "Guided Activation and Modification of Data Plan" filed Jan. 9, 2008 which are incorporated by reference herein in their entirety.

BACKGROUND

Routers allow client devices in a local area network (LAN) to access a wide area network (WAN). Often, a router connects to the WAN via a data exchanger such as a data enabled cellular device, a DSL modem, or a cable modem. A given router may be equipped to simultaneously connect to multiple data exchangers. A data exchanger in the form of a data enabled cellular device is typically associated with a data plan allowing that device to be used to access the WAN. The data plan specifies cost, payment methods, access privileges, and the like. Access privileges can relate to data transfer rate and volume limitations, time of use limitations, as well as content limitations. For example, access privileges may limit transfer speeds to a fraction of the potential available to the data exchanger. Other access privileges may limit data transfers to a certain number of megabytes per time period. Yet other access privileges may limit the content or type of data that can be transferred. For example, access privileges may block or restrict communications from file sharing applications or the transfer of large files in general.

When presented with a new data exchanger, the data plan is typically inactive preventing the device from being used to access the WAN. Unfortunately, a user is not provided with the ability to efficiently activate or even modify a data plan.

DETAILED DESCRIPTION

Introduction: Various embodiments described below operate to guide a user through the activation and/or modification of a data plan for a data exchanger such as a data capable cellular device. According to one implementation, following connection of the data exchanger to a router device, the router device causes the data exchanger to establish a remote data link with a data service provider associated with the data exchanger. The data service provider maintains a registry of known data exchangers and the access privileges assigned to each. The router device communicates with the data service provider to ascertain the access privileges for the particular data exchanger being used.

If the router device determines that the data exchanger has no access privileges with the internet service provider 22, the router device requests content, referred to herein as "access content", from the data service provider to present to the user concerning establishing or otherwise modifying access privileges for the data exchanger. The router device presents this content to the user as a graphical interface displayed by a client device. As an example, the content may include an offer to establish a contractual agreement between the user and the data service provider, whereby the data service provider agrees to provide the data exchanger with a certain level of internet access privileges for a certain period of time. In exchange, the user agrees to be bound by the terms of the contract which may include scheduled payments in the future or a single payment made at the moment.

If the user decides to establish access privileges, thus activating a data plan, for the data exchanger, the user interacts with the user interface providing the required information, referred to herein as "access data", to the data service provider. Assuming the terms of the contract have been met, including any financial transaction, the data service provider server creates or modifies the registry entry for that particular data exchanger providing the data exchanger with increased access privileges.

Figure 1:
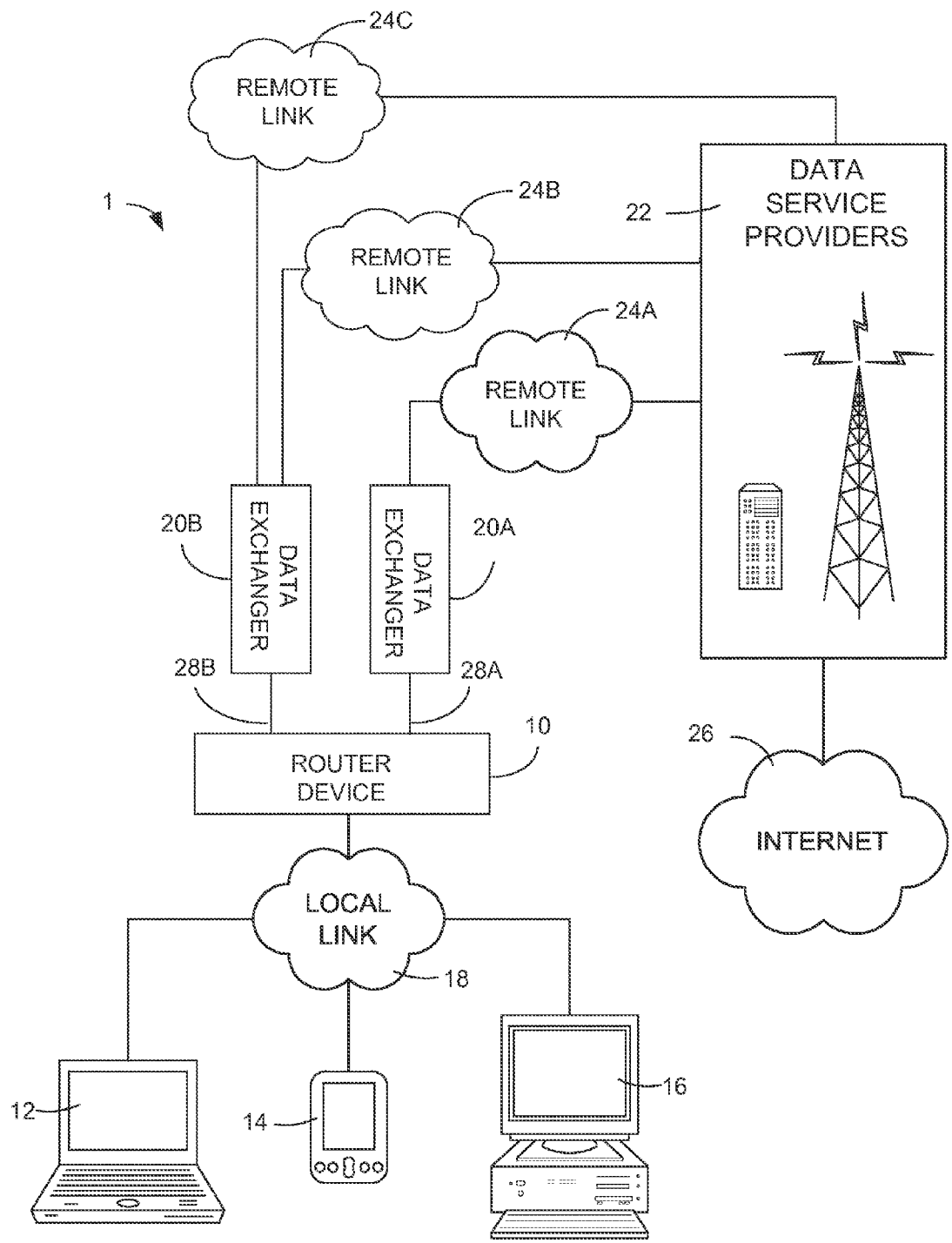
FIG. 1 illustrates an exemplary environment in which embodiments of the present invention can be implemented.

Environment: FIG. 1 illustrates exemplary environment 1 in which various embodiments of the present invention may be implemented. Environment 1 includes router device 10 and clients 12, 14, and 16 and local link 18. Clients 12, 14, and 16 represent generally any computing devices capable of communicating with router device 10. Router device 10, discussed in more detail later, represents generally a device capable of connecting to clients 12, 14, and 16 and performing one or more tasks as guided by a connected client.

Local link 18 interconnects router device 10 and clients 12, 14, 16. Local link 18 represents generally a cable, wireless, or remote link via a telecommunication link, an infrared link, a radio frequency link, or any other connector or system that provides electronic communication between devices 10, 12, 14, and 16. The path followed by link 18 between devices 10, 12, 14, and 16 in the schematic view of FIG. 1 represents the logical communication path between these devices, not necessarily the physical path between the devices. Devices 10, 12, 14, and 16 can be connected at any point and the appropriate communication path established logically between the devices.

Environment 1 also includes data exchangers 20A, 20B and service providers 22. Each data exchanger 20A, 20B represents generally any combination of hardware and programming that can be utilized by router device 10 to connect to a wide area network (WAN) such as the internet. A given data exchanger 20A, 20B may, for example, take the form of a data capable cellular device such as a cell phone or card adapter, a DSL modem, a cable modem, or even a dial-up modem.

Service providers 22 represent generally infrastructure configured to provide internet related data services to subscribers such as an owner of data exchangers 20A, 20B. For example, where a given data exchanger 20A, 20B is a data enabled cellular telephone or card adapter, a corresponding service providers 22 may be a cellular telephone service provider capable of providing voice and data services to subscribers allowing access to internet 26. Where a given data exchanger 22A, 22B is a DSL or cable modem, a corresponding service providers 22 may include a more traditional internet service provider (ISP) providing data access to internet 26.

Remote links 24A, 24B, 24C are each a data link that interconnects a given data exchanger 20A, 20B and service provider 22. Each remote link 24A, 24B, 24C represents generally any combination of a cable, wireless, or remote connection via a telecommunication link, an infrared link, a radio frequency link, or any other connectors or systems that provides electronic communication between data exchanger 20 and service providers 22.

In the embodiment illustrated in environment 1, device links 28A, 28B interconnect router device 10 and data exchangers 20A, 20B. Each device link 28A, 28B represents generally any combination of a cable, wireless, or remote connection via a telecommunication link, an infrared link, a radio frequency link, or any other connector or system that provides electronic communication between devices 10 and 20. As examples, device link 28 may incorporate a physical USB cable or radio waves carrying communications of any one of a number of protocols such as Bluetooth.

It is noted that one or both data exchangers 20A, 20B may be fully integrated into router device 10 or may be cards, dongles, or the like that plug into router device 10. Thus one or both device links 28A, 28B may include internal connections within router device 10. While FIG. 1 illustrates the existence of two data exchangers 20A, 20B, router device 10 may be configured to utilize any number of data exchangers.

Figure 2:
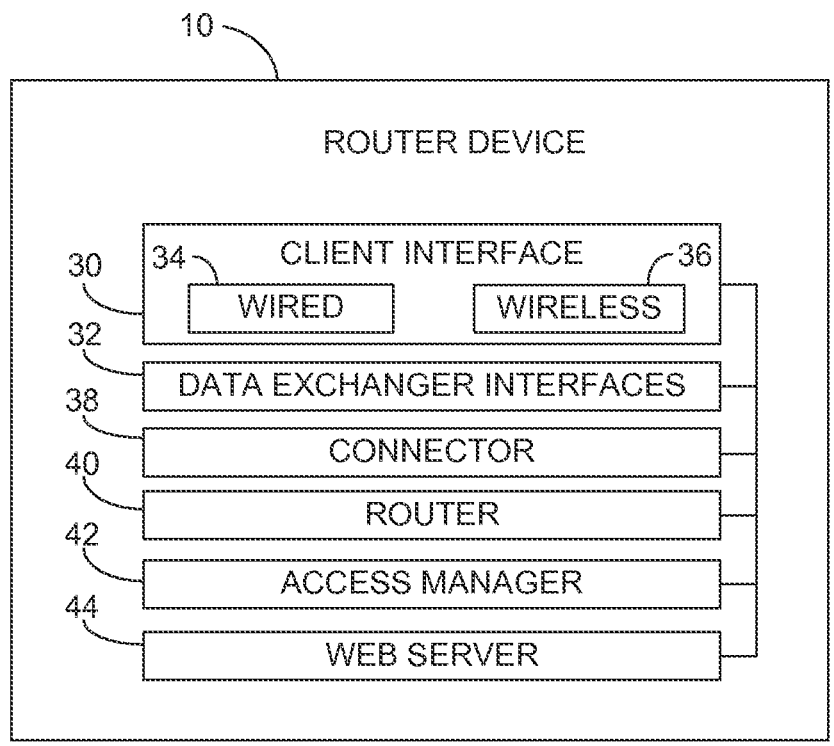
FIGS. 2-4 are block diagrams showing physical and logical components of a router device according to an embodiment of the present invention.
Figure 3:
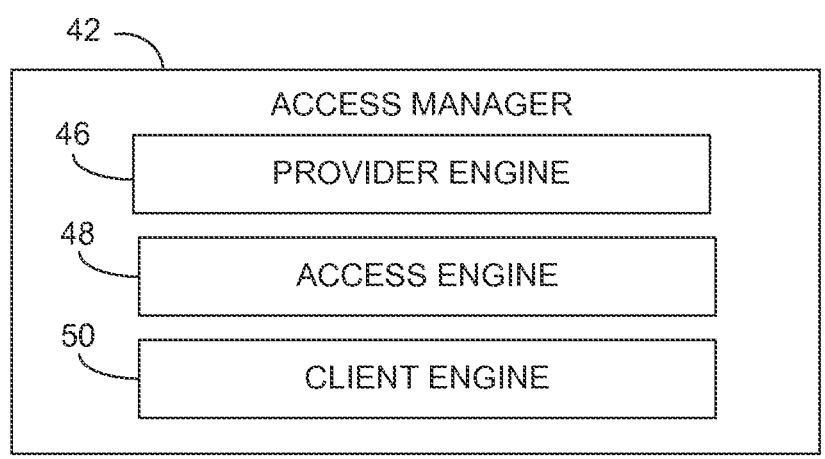

FIG. 2 is a block diagram illustrating physical and logical components of router device 10. In this example, router device 10 represents generally any combination of hardware and programming capable of routing network communications between clients on the local network and between the clients and a wide area network such as the internet via a selected one of a plurality of data exchangers. In the example of FIG. 3 router device 10 includes client interface 30 and data exchanger interfaces 32. Client interface 30 represents generally any combination of hardware and program instructions capable of supplying a communication interface between router device 10 and clients 12, 14, and 16 shown in FIG. 1. Data exchanger interfaces 32 each represent any combination of hardware and programming enabling data to be communicated between router device 10 and a data exchanger such as data exchanger 20A or 20B in FIG. 1.

Client interface 30 is shown to include wired interface 34 and wireless interface 36. Wired interface 34 represents generally any interface through which communications can pass between router device 10 and clients 12, 14, and 16 via one or more physical wires. Wired interface 34 may include one or more serial or parallel ports including but not limited to USB and FireWire ports. Wireless interface 36 represents generally any interface through which information can be exchanged between router device 10 and clients 12, 14, and 16 via a wireless protocol such as ultrawideband (UWB), Bluetooth, or 802.11.

Router device 10 also includes connector 38, router 40, access manager 42, web server 44, and memory 46. Connector 38 represents generally any combination of hardware and programming configured to send commands for controlling data exchangers of various types. In the example of FIG. 1, router device 10 utilizes data exchangers 20A and 20B. Data exchangers 20A and 20B may be from different manufactures and may be designed to interact with different data service providers. Thus, connector 38 utilizes different commands for each data exchanger 20A and 20B to achieve the same result. Connector 38 is responsible for sending appropriate commands to cause a selected data exchanger to perform a particular task. Such tasks can include establishing a remote link with a data service provider so that access can be made to a wide area network such as internet 26. Other tasks include sending signals to poll a data exchanger for link status information identifying a state of the remote link between the data exchanger and a wide area network.

Where the remote link between a given data exchanger and a corresponding data service provider is wireless, the link status information can identify a signal strength of the remote link and a data transfer rate of the remote link. For a data enabled cellular device, the signal strength is a function of the proximity of the data exchanger and a cell tower or other transceiver with which the data exchanger communicates. Improved signal strength can allow for improved data transfer rates.

Router 40 represents generally any combination of hardware and programming for routing network communication received through client interface 30 to be transmitted by a selected data exchanger to a wide area network such as internet 26. Router 40 is also responsible for routing inbound network communications received from a wide area network and directed via client interface 30 to a specified client 12, 14, or 16. Outbound and inbound network communications, for example can be an IP (internet Protocol) packets directed to a target on a wide area network or to a particular network device 12, 14, or 16 on a local area network.

While a given data exchanger can establish a remote link with a data service provider, that data exchanger may not have access privileges for accessing a WAN such as the internet. In other words, absent sufficient access privileges, the data service provider prevents the data exchanger from being utilized to route data communications between a client device and the internet. Access manager 42, as discussed in more detail below with respect to FIG. 3, represents generally any combination of hardware and programming capable of communicating with a data service provider via a remote link established by a given data exchanger to ascertain that data exchangers access privileges. Upon a determination that the data exchanger lacks access privileges for a desired function, access manager 42 requests access content from the data service provider. The desired function may be the routing of data of any type or of a particular type. The access content represents electronic information that can be presented to a client device to allow the user of the client device to supply information, referred to as "access data" for establishing the requisite access privileges. Such information may include billing and other personal information. Once supplied by the user, the access data is returned to the data service provider and the access privileges for the data exchanger are updated. Assuming the update results in sufficient access privileges, the data exchanger is used to perform the desired function.

Web server 44 represents generally any combination of hardware and programming capable of serving interfaces such as web pages to clients 12, 14, and 16. Such web pages may include web pages that when displayed present the user with the controls allowing the user to supply the access data needed to establish sufficient access rights for a data exchanger.

Referring now to FIG. 3, access manager 42 is depicted to include provider engine 46, access engine 48, and client engine 50. Provider engine 46 represents generally any combination of hardware and programming capable of communicating with a data service provider via a given data exchanger and remote link established by that data exchanger and the data service provider. Such communications are for ascertaining access privileges of the data exchanger. Access engine 48 represents generally any combination of hardware and programming capable of requesting, via that same remote link, access content from the data service provider upon a determination that the data exchanger does not have sufficient access privileges to perform a desired function. As examples, one function may be to simply be used to route data communications. A more specific function may be the routing of data communications of a particular type, such as file sharing or large file transfers. Other function might include transfer rates at a particular speed. Thus, in a given situation it may be determined that the data exchanger does not have sufficient access privileges to be used to route data communications or to route data communications of a particular type or to route data communications at a desired speed.

Client engine 50 represents generally any combination of hardware and programming capable of providing access content to a client device. In doing so, client engine 50 may utilize web server 44 to redirect a client device that has attempted to access the internet. In redirecting the client device, client engine 50 causes web server 44 to provide the client device with a web page that includes the access content. Access data provided by the user the client device is then returned to the data service provider. Assuming the access data allows the data service provider to establish sufficient access privileges, the data exchanger is allowed to be used for the desired function.

In a given implementation, router device 10 receives a connection request from a client device. Such a connection request may be a request to access a web site on the internet. A data exchanger is coupled to router device 10 via a given data exchanger interface 32. Connector 38 causes the data exchanger to establish a remote link with a data service provider. Provider engine 46 communicates with the data service provider to determine if the data exchanger has sufficient access privileges to be used to access the internet. Assuming it does not, access engine 48 requests access content from the data service provider and client engine 50 redirects the client device to a web page that includes that access data. Such a web page would include user controls for agreeing to terms and supplying personal and billing information. This access data is returned to the data service provider and the access privileges for the data exchanger are updated accordingly. Assuming sufficient access privileges are now afforded, the data exchanger is allowed to be used to access the internet via the remote link established with the data service provider.

Figure 4:
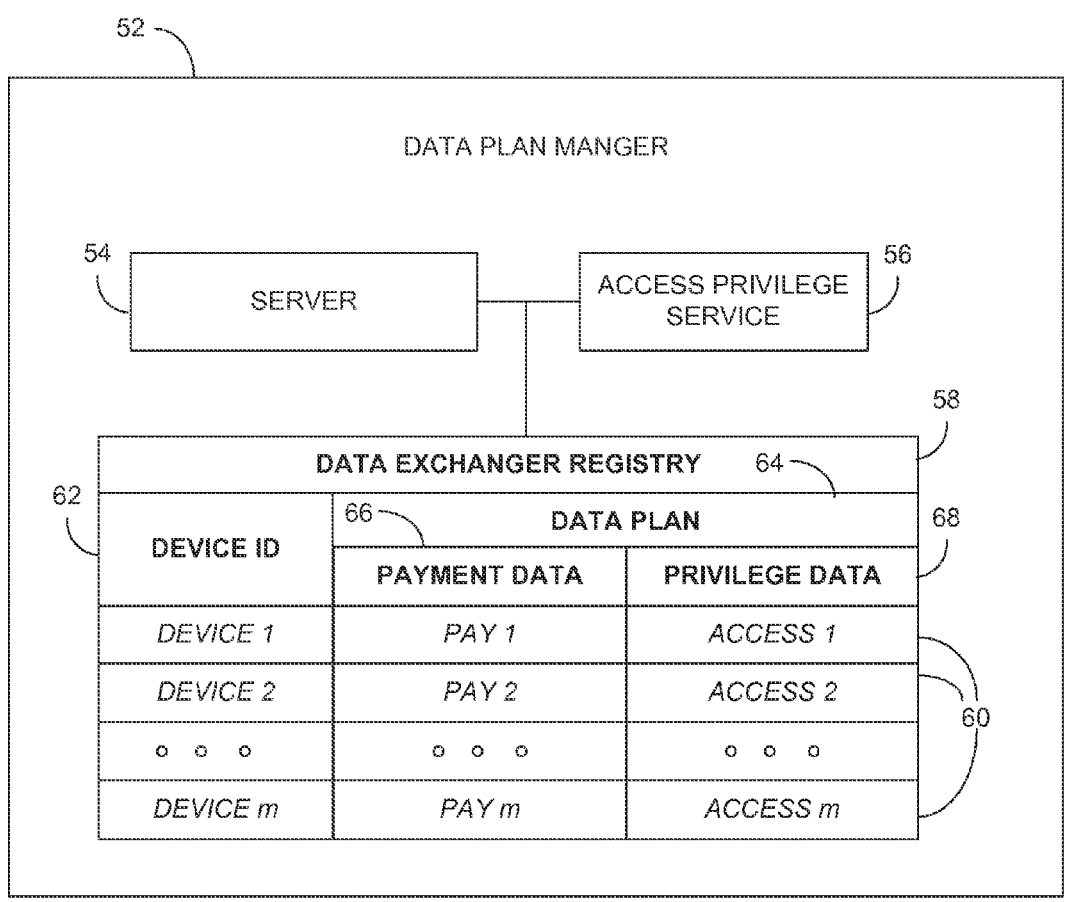

FIG. 4 is a block diagram illustrating physical and logical components of data plan manager 52. Data plan manager 52 represents any combination of hardware and programming capable of maintaining, on behalf of a data service provider, a registry of known data exchangers. Utilizing this registry, data plan manager 52 determines whether or not a particular data exchanger is allowed to be used to perform a desired function. For example, a data exchanger establishes a remote link to the data service provider. Via that link, data plan manager 52 receives a request to determine whether the data exchanger has access privileges for a particular function. In establishing the remote link, the data exchanger identifies itself providing unique information such as a hardware address. Using that identifying information and the nature of the function to be performed, the data plan manager 52 returns a response indicating whether or not the data exchanger has sufficient access privileges. Data plan manager 52 is also responsible for returning access content, described above, and for updating access privileges.

In the example of FIG. 4, data plan manager 52 is shown to include server 54, access privilege service 56, and data exchanger registry 58. Access privilege service 56 is responsible for receiving, via server 54 a request for a determination as to whether or not a particular data exchanger has sufficient access privileges for a particular function. In doing so, service 56, as discussed below, parses data exchanger registry 58 and uses server 54 to return a response. Access privilege service 56 is responsible for using server 54 to receive requests for and to return access data for a particular data exchanger. As noted above, a client device presents a web page containing controls for supplying access data. Access data entered through that web page is returned to data plan manager 52. Thus, access privilege service 56 is also responsible for updating data exchanger registry 58 according to the returned access data.

Data exchanger registry 58 is depicted as a database of entries 60. Each entry 60 includes information in a number of fields 62-68 and corresponds to a particular data exchanger known to data plan manager 52. Data in field 62 of a given entry 60 includes data identifying a particular data exchanger. Such identifying data may, for example, include a hardware address of that data exchanger. Thus, when a data exchanger establishes a remote link to a data service provider, the data exchanger's hardware address is provided with communications sent over that remote link. Upon receipt of the hardware address access privilege manager 56 can identify an entry 60, if one exists, for that data exchanger.

Data in field 64 of a given entry includes information corresponding to a data plan for a given data exchanger. Data in field 64 is broken into two sub-fields 66 and 68. Data in field 66 identifies payment data associated with the given data exchanger while data in field 68 identifies access privileges associated with that data exchanger. As noted, access privileges can restrict whether or not a data exchanger can be used to access the internet. Access privileges can restrict the type of data communications that can be routed between a client device and the internet. Access privileges can restrict the speed or transfer rate at which data communications are routed. Thus, upon identifying an entry 60 for a given data exchanger, access privilege service 56 can identify, obtain, and, when appropriate, update payment information and access privileges associated with that data exchanger.

Figure 5:
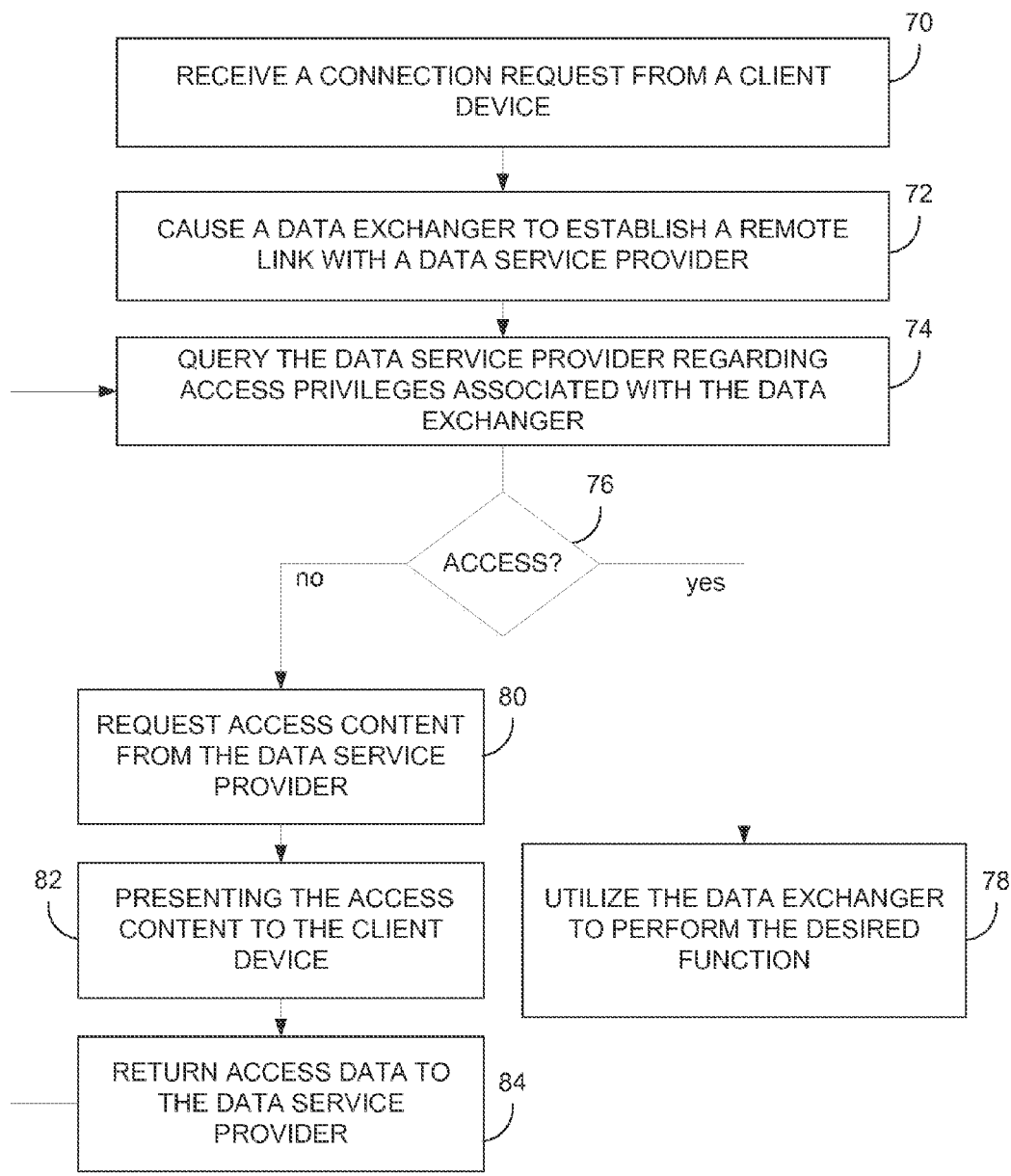
FIG. 5 is an exemplary flow diagrams illustrating steps taken in performance of various embodiments of the present invention.

Operation: The operation of embodiments of the present invention will now be described with reference to FIG. 5. FIG. 5 is an exemplary flow diagram that depicts actions taken by a router device to guide a user in establishing sufficient access privileges that allow a data exchanger to be used for a desired function.

A connection request is received from a client device (step 70). A data exchanger is caused to establish a remote link with a data service provider (step 72). The data service provider is queried regarding access privileges associated with the data exchanger (step 74). Referring back to FIGS. 2 and 3, step 74 may be implemented by access manager 38 querying data plan manager 52. Data plan manager 54 represents a service provided by the data service provider.

If it is determined that the access privileges allow a desired function, the data exchanger is utilized to perform that function (step 78). As discussed, such a function may include the routing of data between a client device on a local area network and the internet. Another function may include the routing of a particular type or types of data communications. Yet another function may be the routing of data communications at or above a particular speed.

If it is determined that the access privileges do not allow the desired function, a request for access content is made of the data service provider (step 82). The access content is presented to the client device (step 82). The access content when presented by the client device enables a user to supply access data. The access data is returned to the data service provider (step 84). The access data is used by the data service provider to set access privileges associated with the data exchanger that enable the data exchanger to be utilized to perform the desired function.

Conclusion: The schematic diagram of FIG. 1 illustrates an exemplary environment in which embodiments of the present invention may be implemented. Implementation, however, is not limited to this environment. The diagrams of FIGS. 2-4 show the architecture, functionality, and operation of various embodiments of the present invention. A number of the blocks are defined as programs. Each of those blocks may represent in whole or in part a module, segment, or portion of code that comprises one or more executable instructions to implement the specified logical function(s). Each block may also represent in whole or in part a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagram of FIG. 5 shows a specific order of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention.

What is claimed is:

1. A method, implemented by a router device, for guiding a user in establishing access privileges for a data exchanger, comprising:
    causing the data exchanger to establish a remote link with a data service provider;
    querying the data service provider as to whether the data exchanger is associated with access privileges that enable the data exchanger to be utilized to perform a desired function, wherein the query is performed by a provider engine of the router device;
    obtaining access content from the data service provider, wherein access content comprises content from the data service provider concerning establishing or otherwise modifying access privileges for the data exchanger;
    presenting the access content to a client device;
    receiving access data provided in response to the presenting of the access content; the access content when presented by the client device enabling a user to supply the access data, the access data being useable by the data service provider to set access privileges associated with the data exchanger that enable the data exchanger to be utilized to perform the desired function;
    returning the access data to the data service provider via the remote link, wherein the data service provider may update the access privileges for the data exchanger; and
    utilizing the data exchanger to implement the desired function, the desired function requiring the updated access privileges.

2. The method of claim 1, wherein the desired function is the routing of a data communication between the client device and the internet via the remote link.

3. The method of claim 1, wherein the desired function is the routing of a data communication of a particular type between the client device and the internet via the remote link.

4. The method of claim 1, wherein the desired function is the routing of a data communication between the client device and the internet via the remote link at or above a specified transfer rate.

5. The method of claim 1,
    wherein the obtaining, the presenting, the receiving, and the returning are performed only upon a determination that the data exchanger is not associated with access privileges that enable the data exchanger to be utilized to perform the desired function.

6. The method of claim 1, wherein the causing the data exchanger to establish a remote link with a data service provider is performed in response to a request to access a web site on the internet by the client device, and wherein the router device redirects the client device to a web page, the web page presenting the access content to the client device, the router device redirecting the client device only upon a determination that the data exchanger is not associated with access privileges that enable the data exchanger to be utilized to perform the desired function.

7. A non-transitory computer readable medium having computer executable instructions that when executed by a router device, cause the router device to implement a method for guiding a user in establishing access privileges for a data exchanger, the method comprising:
    causing the data exchanger to establish a remote link with a data service provider;
    querying the data service provider as to whether the data exchanger is associated with access privileges that enable the data exchanger to be utilized to perform a desired function, wherein the query is performed by a provider engine of the router device;
    obtaining access content from the data service provider, wherein access content comprises content from the data service provider concerning the establishing or otherwise modifying access privileges for the data exchanger;
    presenting the access content to a client device;
    receiving access data provided in response to the presenting of the access content; the access content when presented by the client device enabling a user to supply the access data, the access data being useable by the data service provider to set access privileges associated with the data exchanger that enable the data exchanger to be utilized to perform the desired function;
    returning the access data to the data service provider via the remote link, wherein the data service provider may update the access privileges for the data exchanger; and
    utilizing the data exchanger to implement the desired function, the desired function requiring the updated access privileges.

8. The medium of claim 7, wherein the desired function is the routing of a data communication between the client device and the internet via the remote link.

9. The medium of claim 7, wherein the desired function is the routing of a data communication of a particular type between the client device and the internet via the remote link.

10. The medium of claim 7, wherein the desired function is the routing of data communication between the client device and the internet via the remote link at or above a specified transfer rate.

11. The medium of claim 7,
wherein the obtaining, the presenting, the receiving, and the returning are performed only upon a determination that the data exchanger is not associated with access privileges that enable the data exchanger to be utilized to perform the desired function.

12. A router device, comprising a data exchanger interface, a router, a connector, and an access manager, wherein:
the data exchanger interface is configured to provide an interface between the router device and a data exchanger coupled to the data exchanger interface;
the connector is configured to cause the data exchanger to establish a remote link with the data service provider;
the router is configured to route data communications between a client device on a local area network and the wide area network via a remote link established by the data exchanger coupled to the data exchanger interface; and
the access manager is configured to:
query the data service provider as to whether the data exchanger is associated with access privileges that enable the data exchanger to be utilized to perform a desired function;
obtain access content from the data service provider, wherein access content comprises content from the data service provider concerning the establishing or otherwise modifying access privileges for the data exchanger;
present the access content to the client device;
receive access data provided in response to the presentation of the access content; the access content when presented by the client device enabling a user to supply the access data, the access data being useable by the data service provider to set access privileges associated with the data exchanger that enable the data exchanger to be utilized to perform a desired function;
return the access data to the data service provider via the remote link, wherein the data service provider may update the access privileges for the data exchanger; and
cause the router to utilize the data exchanger to implement the desired function, the desired function requiring the updated access privileges.

13. The router device of claim 12, wherein the desired function is the routing of a data communication between the client device and the internet via the remote link.

14. The router device of claim 12, wherein the desired function is the routing of a data communication of a particular type between the client device and the internet via the remote link.

15. The router device of claim 12, wherein the desired function is the routing of data communication between the client device and the internet via the remote link at or above a specified transfer rate.

16. The router device of claim 12,
wherein the access manager the obtains and presents the access content and receives and returns the access data only upon a determination that the data exchanger is not associated with access privileges that enable the data exchanger to be utilized to perform the desired function.

17. The router of claim 12, wherein the connector is further configured to cause the data exchanger to establish a remote link with the data service provider in response to a request to access a web site on the internet by the client device, and wherein the access manager is further configured to redirect the client device to a web page, the web page presenting the access content to the client device, the access manager redirecting the client device only upon a determination that the data exchanger is not associated with access privileges that enable the data exchanger to be utilized to perform the desired function.

18. The router of claim 12, where in the connector is further configured to communicate with a plurality of data exchangers designed to interact with different data service providers, wherein the connector utilizes different commands for different data exchangers to establish the remote link.

* * * * *